US012578822B2

(12) United States Patent
Quinn

(10) Patent No.: US 12,578,822 B2
(45) Date of Patent: Mar. 17, 2026

(54) TOUCH COORDINATE EDGE CORRECTION

(71) Applicant: Google LLC, Mountain View, CA (US)

(72) Inventor: Philip Quinn, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/701,571

(22) PCT Filed: Oct. 20, 2021

(86) PCT No.: PCT/US2021/055798
§ 371 (c)(1),
(2) Date: Apr. 15, 2024

(87) PCT Pub. No.: WO2023/069088
PCT Pub. Date: Apr. 27, 2023

(65) Prior Publication Data
US 2024/0402851 A1 Dec. 5, 2024

(51) Int. Cl.
*G06F 3/041* (2006.01)
*G06F 3/044* (2006.01)

(52) U.S. Cl.
CPC .......... *G06F 3/04186* (2019.05); *G06F 3/044* (2013.01)

(58) Field of Classification Search
CPC ....................................................... G06F 3/044
USPC ................................................. 345/173–174
See application file for complete search history.

(56) References Cited

U.S. PATENT DOCUMENTS

2011/0148806 A1* 6/2011 Oda ...................... G06F 3/0445
345/174
2014/0160043 A1 6/2014 Hwang et al.

2014/0168171 A1 6/2014 Oh et al.
2015/0015538 A1 1/2015 Tanaka et al.
2015/0242053 A1 8/2015 Gao et al.
2015/0309659 A1 10/2015 Liu
2015/0370411 A1 12/2015 Patel et al.
(Continued)

FOREIGN PATENT DOCUMENTS

CN 107765918 A 3/2018
KR 20140052482 A 5/2014
(Continued)

OTHER PUBLICATIONS

International Search Report and Written Opinion of International Application No. PCT/US2021/055798 dated Jul. 14, 2022, 13 pp.
(Continued)

*Primary Examiner* — Kwin Xie
(74) *Attorney, Agent, or Firm* — Shumaker & Sieffert, P.A.

(57) ABSTRACT

One or more processors of a computing device may map touch input data generated by a touch sensor of a presence-sensitive display to a touch location at the presence-sensitive display, wherein the touch input data is indicative of a touch input detected at the presence-sensitive display, determine that the touch location is within an edge region of the presence-sensitive display, in response to determining that the touch location is within the edge region of the presence-sensitive display, determine, based at least in part on the touch location, a corrected touch location at the presence-sensitive display that is closer to a nearest edge of the presence-sensitive display than the touch location, and determine that the touch input corresponds to user input at the corrected touch location of the presence-sensitive display.

20 Claims, 9 Drawing Sheets

(56) References Cited

U.S. PATENT DOCUMENTS

| | | | | | |
|---|---|---|---|---|---|
| 2017/0031521 | A1 | | 2/2017 | Drake | |
| 2017/0336891 | A1 | * | 11/2017 | Rosenberg | G06F 3/04144 |
| 2018/0081482 | A1 | * | 3/2018 | Gui | G06F 3/04144 |
| 2018/0088721 | A1 | * | 3/2018 | Moon | G06F 3/0446 |
| 2019/0086954 | A1 | * | 3/2019 | Hotelling | H03K 17/96 |

FOREIGN PATENT DOCUMENTS

| | | | | | | |
|---|---|---|---|---|---|---|
| KR | 20150065999 | A | * | 6/2015 | | G06F 3/044 |
| WO | WO-2017175035 | A1 | * | 10/2017 | | G06F 3/0412 |
| WO | WO-2018096386 | A1 | * | 5/2018 | | G01R 27/2605 |

OTHER PUBLICATIONS

Response to Office Action dated Jul. 10, 2025, from counterpart Indian Application No. 202447031333 filed Oct. 9, 2025, 18 pp.
First Examination Report from counterpart Indian Application No. 202447031333 dated Jul. 10, 2025, 8 pp.

* cited by examiner

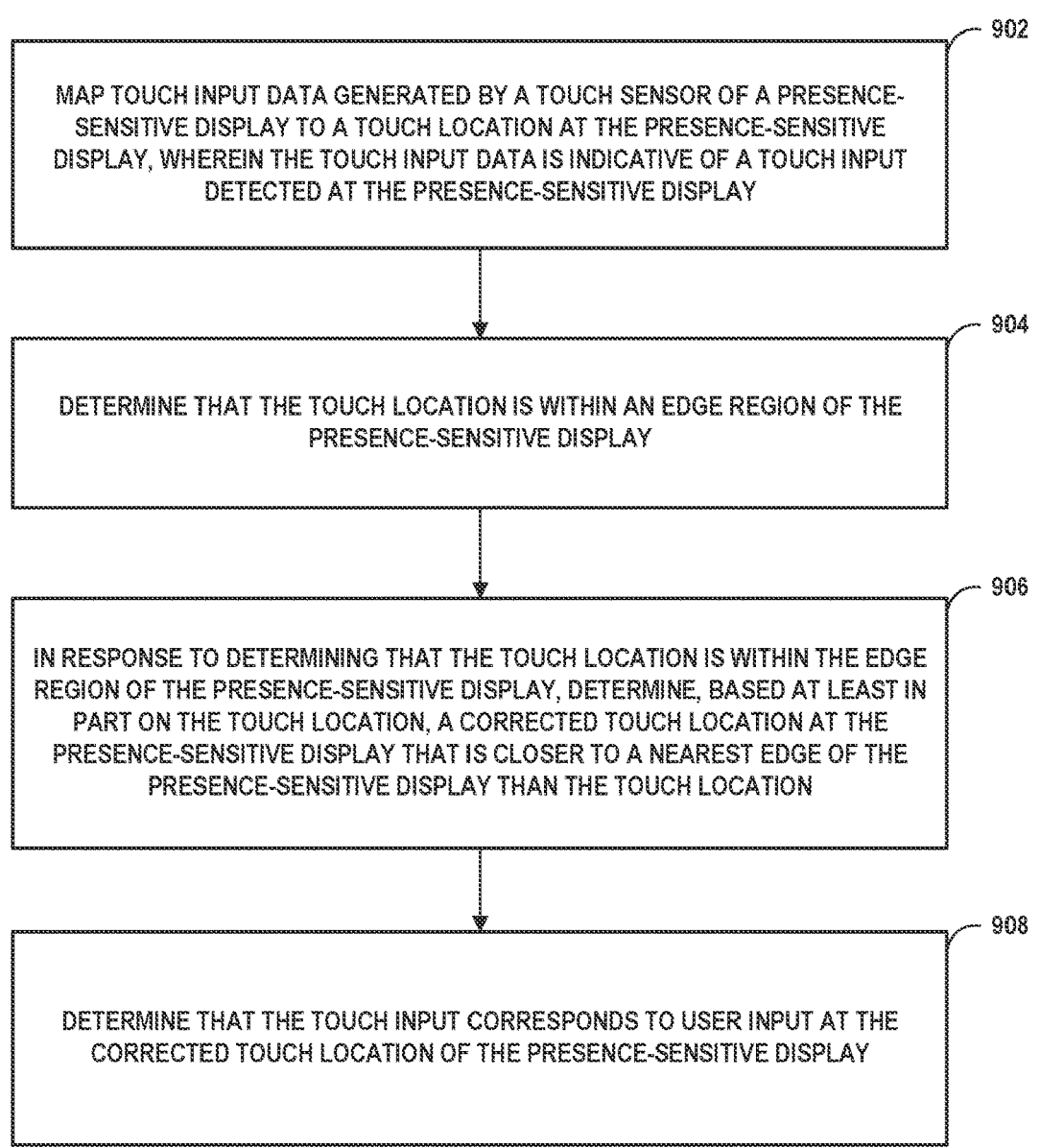

902

MAP TOUCH INPUT DATA GENERATED BY A TOUCH SENSOR OF A PRESENCE-SENSITIVE DISPLAY TO A TOUCH LOCATION AT THE PRESENCE-SENSITIVE DISPLAY, WHEREIN THE TOUCH INPUT DATA IS INDICATIVE OF A TOUCH INPUT DETECTED AT THE PRESENCE-SENSITIVE DISPLAY

904

DETERMINE THAT THE TOUCH LOCATION IS WITHIN AN EDGE REGION OF THE PRESENCE-SENSITIVE DISPLAY

906

IN RESPONSE TO DETERMINING THAT THE TOUCH LOCATION IS WITHIN THE EDGE REGION OF THE PRESENCE-SENSITIVE DISPLAY, DETERMINE, BASED AT LEAST IN PART ON THE TOUCH LOCATION, A CORRECTED TOUCH LOCATION AT THE PRESENCE-SENSITIVE DISPLAY THAT IS CLOSER TO A NEAREST EDGE OF THE PRESENCE-SENSITIVE DISPLAY THAN THE TOUCH LOCATION

908

DETERMINE THAT THE TOUCH INPUT CORRESPONDS TO USER INPUT AT THE CORRECTED TOUCH LOCATION OF THE PRESENCE-SENSITIVE DISPLAY

FIG. 9

TOUCH COORDINATE EDGE CORRECTION

BACKGROUND

Some computing devices may include touch or other presence sensors capable of detecting user input. For example, a computing device may include a presence-sensitive display capable of both displaying graphical objects and receiving user input to enable user interaction with the displayed graphical objects. Some example interactions include the user moving their finger across the presence-sensitive display to drag an object and/or cause the computing device to scroll.

One example of a presence sensor is a capacitive touch sensor. A capacitive sensor panel is constructed from a matrix of row and column electrodes on either side of a dielectric material. The electrodes are typically constructed from a transparent conductive material, such as Indium Tin Oxide (ITO), so they can be placed above a display module and be invisible to the user. The dielectric material is typically a glass substrate. The touch panel module may be adhered to the surface of a display module (e.g., a liquid crystal display (LCD) or organic light emitting diode (OLED) display), and may be placed under a protective covering glass. The electrodes may be connected to a touch controller that can both drive the electrodes with a voltage signal and sense resultant changes in capacitance.

When an electrode is driven with a voltage signal, the electrode's inherent capacitance to other objects (such as a human finger, another electrode, or ground) can be measured. The computing device may detect, based on the measured capacitance of the electrodes of the capacitive touch sensor, touch input at the presence-sensitive display.

SUMMARY

In general, techniques of this disclosure are directed to techniques for enabling a user of a computing device to more easily provide user input at or near the edge of a presence-sensitive display. When a user provides touch input in an attempt to provide user input at an edge of the presence-sensitive display, the computing device may determine a weighted average of the locations of the touch sensor cells that sense the touch input to determine the touch location of the touch input. However, using such a weighted average to determine the touch location of a touch input may nonetheless cause the computing device to map touch input provided at an edge of the presence-sensitive display to a touch location away from the edge of the presence-sensitive display.

In accordance with aspects of the present disclosure, when a user provides touch input at a presence-sensitive display, the computing device may determine whether the touch location for the touch input is within an edge region of the presence-sensitive display. The computing device may, in response to determining that the touch location for the touch input is within an edge region of the presence-sensitive display apply a correction to the touch location for the touch input to compensate for the computing device not being able to map the touch input to a touch location at the edge of the presence-sensitive display. That is, the computing device may apply an offset to the coordinates of the touch location to move the touch location for the input towards the nearest edge of the presence-sensitive display to a corrected touch location. The computing device may therefore determine that the touch input corresponds to user input at the corrected touch location of the presence-sensitive display.

The techniques of this disclosure may therefore enable a user to provide touch input that is mapped to the edges of the presence-sensitive display. Enabling the user to provide touch input that is mapped to the edges of the presence-sensitive display may prevent errors in mapping touch input to locations at or near the edges of the presence-sensitive display and may also improve the user experience when the user interacts with the presence-sensitive display to provide user input.

In one example, a method includes mapping, by one or more processors of a computing device, touch input data generated by a touch sensor of a presence-sensitive display to a touch location at the presence-sensitive display, wherein the touch input data is indicative of a touch input detected at the presence-sensitive display, determining, by the one or more processors, that the touch location is within an edge region of the presence-sensitive display, in response to determining that the touch location is within the edge region of the presence-sensitive display, determining, by the one or more processors and based at least in part on the touch location, a corrected touch location at the presence-sensitive display that is closer to a nearest edge of the presence-sensitive display than the touch location, and determining, by the one or more processors, that the touch input corresponds to user input at the corrected touch location of the presence-sensitive display.

In another example, a computing device includes a presence-sensitive display; and one or more processors communicably coupled to the presence-sensitive display and configured to: map touch input data generated by a touch sensor of the presence-sensitive display to a touch location at the presence-sensitive display, wherein the touch input data is indicative of a touch input detected at the presence-sensitive display; determine that the touch location is within an edge region of the presence-sensitive display; in response to determining that the touch location is within the edge region of the presence-sensitive display, determine, based at least in part on the touch location, a corrected touch location at the presence-sensitive display that is closer to a nearest edge of the presence-sensitive display than the touch location; and determine that the touch input corresponds to user input at the corrected touch location of the presence-sensitive display.

In another example, a non-transitory computer-readable storage medium storing instructions that, when executed, cause one or more processors of a computing device to: map touch input data generated by a touch sensor of a presence-sensitive display to a touch location at the presence-sensitive display, wherein the touch input data is indicative of a touch input detected at the presence-sensitive display; determine that the touch location is within an edge region of the presence-sensitive display; in response to determining that the touch location is within the edge region of the presence-sensitive display, determine, based at least in part on the touch location, a corrected touch location at the presence-sensitive display that is closer to a nearest edge of the presence-sensitive display than the touch location; and determine that the touch input corresponds to user input at the corrected touch location of the presence-sensitive display.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 9 is a flowchart illustrating example operations of an example computing device to perform touch coordinate edge correction, in accordance with one or more aspects of the present disclosure.

DETAILED DESCRIPTION

Figure 1:
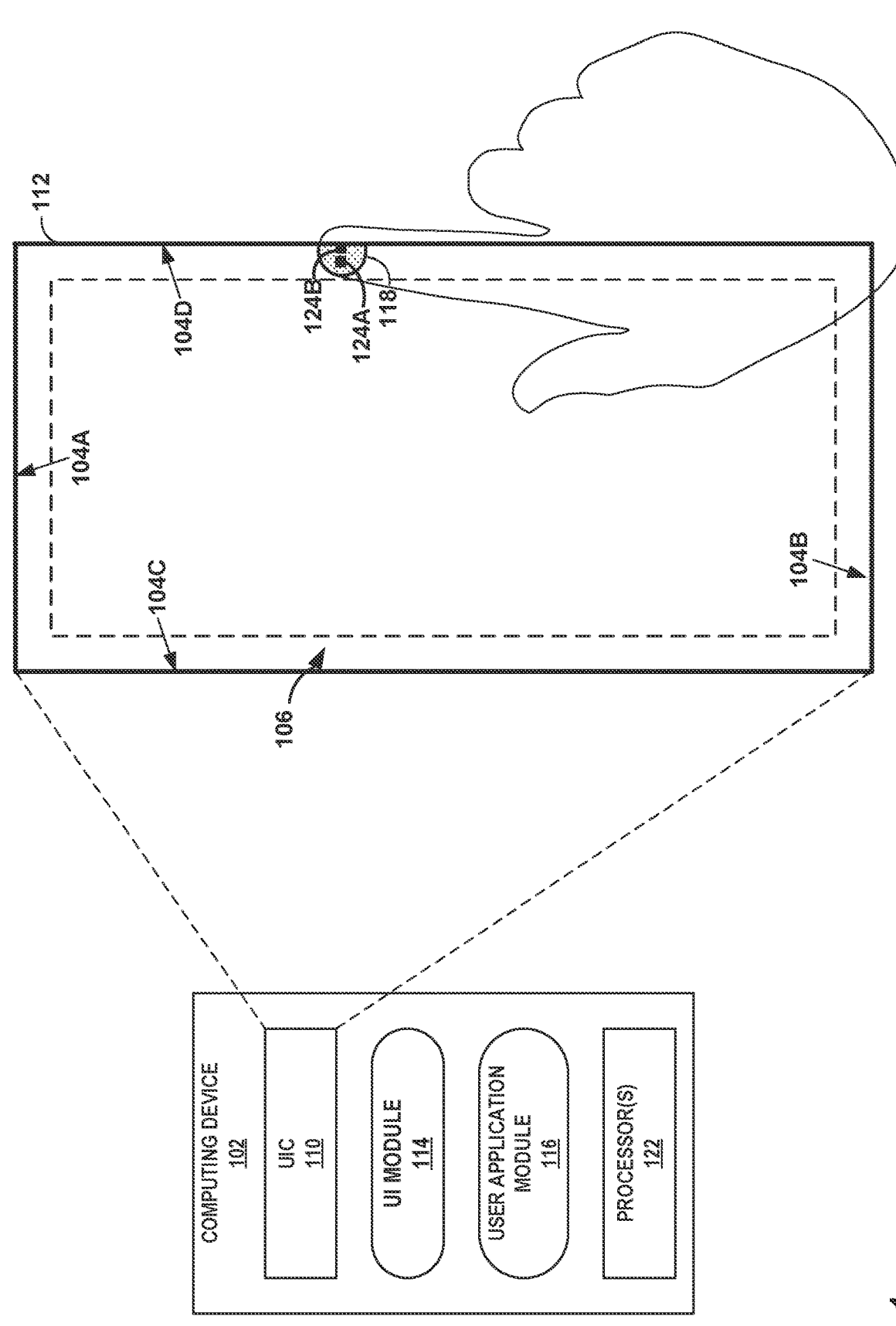
FIG. 1 is a conceptual diagram illustrating an example computing device including a presence-sensitive display, in accordance with one or more aspects of the present disclosure.

FIG. 1 is a conceptual diagram illustrating an example computing device 102 including a presence-sensitive display 112. FIG. 1 illustrates only one particular example of computing device 102 and many other examples of computing device 102 may be used in other instances. In the example of FIG. 1, computing device 102 may be a wearable computing device, a mobile computing device, or any other computing device capable of receiving user input. Computing device 102 of FIG. 1 may include a subset of the components included in example computing device 102 or may include additional components not shown in FIG. 1.

In the example of FIG. 1, computing device 102 can be a mobile phone. However, computing device 102 may also be any other type of computing device such as a camera device, a tablet computer, a personal digital assistant (PDA), a smart speaker, a laptop computer, a desktop computer, a gaming system, a media player, an e-book reader, a television platform, an automobile navigation system, or a wearable computing device (e.g., a computerized watch). As shown in FIG. 1, computing device 102 includes user interface component (UIC) 110, UI module 114, user application module 116, and processor(s) 122.

UIC 110 may function as respective input and/or output devices for mobile computing device 102. As shown in FIG. 1, UIC 110 includes presence-sensitive display 112. UIC 110 may be implemented using various technologies. For instance, UIC 110 may function as input devices using presence-sensitive input screens, such as capacitive touchscreens or projective capacitance touchscreens. UIC 110 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 102. In the example of FIG. 1, presence-sensitive display 112 may be a presence-sensitive display capable of both receiving user input and displaying graphical data.

UIC 110 may detect input (e.g., touch and non-touch input) from a user of respective computing device 102. For instance, presence-sensitive display 112 may detect indications of input by detecting one or more gestures from a user (e.g., the user touching, pointing, and/or swiping at or near one or more locations of presence-sensitive display 112 with a finger or a stylus pen). UIC 110 may output information to a user in the form of a user interface, which may be associated with functionality provided by computing device 102. Such user interfaces may be associated with computing platforms, operating systems, applications, and/or services executing at or accessible from computing device 102 (e.g., electronic message applications, chat applications, Internet browser applications, mobile or desktop operating systems, social media applications, electronic games, menus, and other types of applications).

UI module 114 manages user interactions with UIC 110 and other components of computing device 102. In other words, UI module 114 may act as an intermediary between various components of computing device 102 to make determinations based on user input detected by UIC 110 and generate output at UIC 110 in response to the user input. UI module 114 may receive instructions from an application, service, platform, or other module of computing device 102 to cause UIC 110 to output a user interface. UI module 114 may manage inputs received by computing device 102 as a user views and interacts with the user interface presented at UIC 110 and may update the user interface in response to receiving additional instructions from the application, service, platform, or other module of computing device 102 that is processing the user input.

Computing device 102 may include modules 114 and 116. Modules 114 and 116 may perform operations described using software, hardware, firmware, or a mixture of hardware, software, and/or firmware residing in and/or executing at computing device 102. Computing device 102 may execute modules 114 and 116 with one or more processors. Computing device 102 may execute modules 114 and 116 as a virtual machine executing on underlying hardware. Modules 114 and 116 may execute as a service or component of an operating system or computing platform. Modules 114 and 116 may execute as one or more executable programs at an application layer of a computing platform. Modules 114 and 116 may be otherwise arranged remotely to and remotely accessible to computing device 102, for instance, as one or more network services operating at a network in a network cloud.

Processor(s) 122 may implement functionality and/or execute instructions within computing device 102. Examples of processor(s) 122 include, but are not limited to, one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein.

User application module 116 may execute at computing device 102 to perform any of a variety of operations.

Examples of user application module 116 include, but are not limited to, music applications, photo viewing applications, mapping applications, electronic message applications, chat applications, Internet browser applications, social media applications, electronic games, menus, and/or other types of applications that may operate based on user input.

In operation, user application module 116 may cause UI module 114 to generate a graphical user interface (GUI) for display at UIC 110. UIC 110 may output a graphical user interface based on instructions from user application module 116. In one example, user application module 116 may be a photo viewing application that causes UI module 114 to generate a GUI including a picture of a mountain for display at UIC 110.

A user may desire to provide user input to user application module 116. For instance, where user application module 116 may be a photo viewing application, the user may provide gesture input at UIC 110 in the form of a swipe to swipe between photos of the photo viewing application or may provide gesture input at UIC 110 to select a photo album for viewing. Presence-sensitive display 112 may detect the gesture input. For instance, where presence-sensitive display 112 is a capacitive-touch panel, presence-sensitive display 112 may detect the gesture input via use of one or more capacitive touch sensors of presence-sensitive display 112.

A user may typically provide a gesture input in the form of touch input at presence-sensitive display 112 by moving an input object (e.g., the user's finger, a stylus, etc.) near presence-sensitive display 112 or by touching presence-sensitive display 112 using the input object. Because the size of an input object used to provide the touch input may be larger than the size of a single pixel of presence-sensitive display 112, the capacitive touch sensor of presence-sensitive display 112 may, when the user provides touch input at presence-sensitive display 112, sense the user input at a plurality of touch locations. Computing device 102 may therefore map the plurality of touch locations sensed by the touch sensor to user input at a location of presence-sensitive display 112.

For example, the touch sensor of presence-sensitive display 112 may sense the touch input at a plurality of touch sensor cells, and may generate a corresponding capacitance value at each touch sensor cell that senses the touch input. Computing device 102 may map, based on the location of each of the touch sensor cells that senses the touch input and the corresponding capacitance value of each of the touch sensor cells, the touch input detected at presence-sensitive display 112 to user input at a location of presence-sensitive display 112.

The capacitive touch sensor of presence-sensitive display 112 may be of a lower resolution than the display resolution of presence-sensitive display 112. That is, the touch sensor may include fewer cells than there are pixels in presence-sensitive display 112. For example, presence-sensitive display 112 may have a width of 1080 pixels, but the capacitive touch sensor may be a matrix of touch sensor cells with only 16 touch sensor cells in each row of the matrix.

Presence-sensitive display 112 may include edge region 106, which is a contiguous region of pixels at and near the edges 104A-104D of presence-sensitive display 112. When the user attempts to use the surface of their finger provide touch input at or near an edge of presence-sensitive display 112, only a portion of the surface of the finger may end up contacting presence-sensitive display 112, and the remaining portion of the surface of the finger may fall beyond an edge of presence-sensitive display. Further, the lower resolution of the touch sensor of presence-sensitive display 112 compared to the display resolution of presence-sensitive display 112 may introduce a bias away from the edges of presence-sensitive display 112 when computing device 102 maps the touch input to user input at a location of presence-sensitive display 112 based on the locations of the touch sensor cells that sense the touch input.

As such, when a user provides touch input within edge region 106 of presence-sensitive display 112 in an attempt to provide user input at or near an edge of presence-sensitive display 112, computing device 102 may, instead of mapping the touch input detected at presence-sensitive display 112 to user input at an edge of presence-sensitive display 112, map the touch input to user input at a location that is not at an edge of presence-sensitive display 112.

In accordance with one or more techniques of this disclosure, when computing device 102 receives touch input near an edge of presence-sensitive display 112, computing device 102 may introduce an offset when performing mapping of the touch input to user input at a location of presence-sensitive display 112 to bias the mapping of the location of the touch input towards the nearest edge of presence-sensitive display 112, thereby mapping the touch input to user input at a location that is closer to the nearest edge of presence-sensitive display 112.

In the example of FIG. 1, the user may provide touch input 118, such as gesture input, near edge 104D of presence-sensitive display 112 in an attempt to provide user input at edge 104D of presence-sensitive display 112. Computing device 102 may, in response to presence-sensitive display 112 detecting touch input 118, map touch input 118 to touch location 124A. Computing device 102 may determine whether touch location 124A is within edge region 106 of presence-sensitive display 112.

Computing device 102 may, in response to determining that touch location 124A is within edge region 106 of presence-sensitive display 112, determine, based on touch location 124A, a corrected touch location 124B of presence-sensitive display 112 that is closer to a nearest edge 104D of presence-sensitive display 112 than touch location 124A. That is, computing device 102 may apply an offset to touch location 124A to move touch location 124A closer to the nearest edge 104D to determine a corrected touch location 124B that corresponds to touch input 118.

As can be seen in the example of FIG. 1, while touch location 124A is within edge region 106 of presence-sensitive display 112, touch location 124A is not at edge 104D of presence-sensitive display 112. By applying an offset to touch location 124A to move touch location 124A towards the nearest edge 104D to determine corrected touch location 124B, corrected touch location 124B may be a location at edge 104D of presence-sensitive display 112. Computing device 102 may therefore determine that the gesture input corresponds to user input at corrected touch location 124B of presence-sensitive display 112.

Computing device 102 may therefore utilize the user input at corrected touch location 124B, such as by providing the pixel location of the corrected touch location 124B of the presence-sensitive display 112 to user application module 116. Computing device 102 may perform one or more actions based on the user input. For instance, user application module 16 may cause UI module 114 to generate an updated GUI for display at UIC 110, where the GUI is modified based on the user input. For instance, if user application module 116 is a web browser application and the user provides touch input at presence-sensitive display 112 to select, on a web page, a hyperlink to another web page, user application module 116 may access the other web page that corresponds to the selected hyperlink and may cause UI module 114 to generate a GUI that includes the web page that corresponds to the hyperlink for display at UIC 110.

Figure 2:
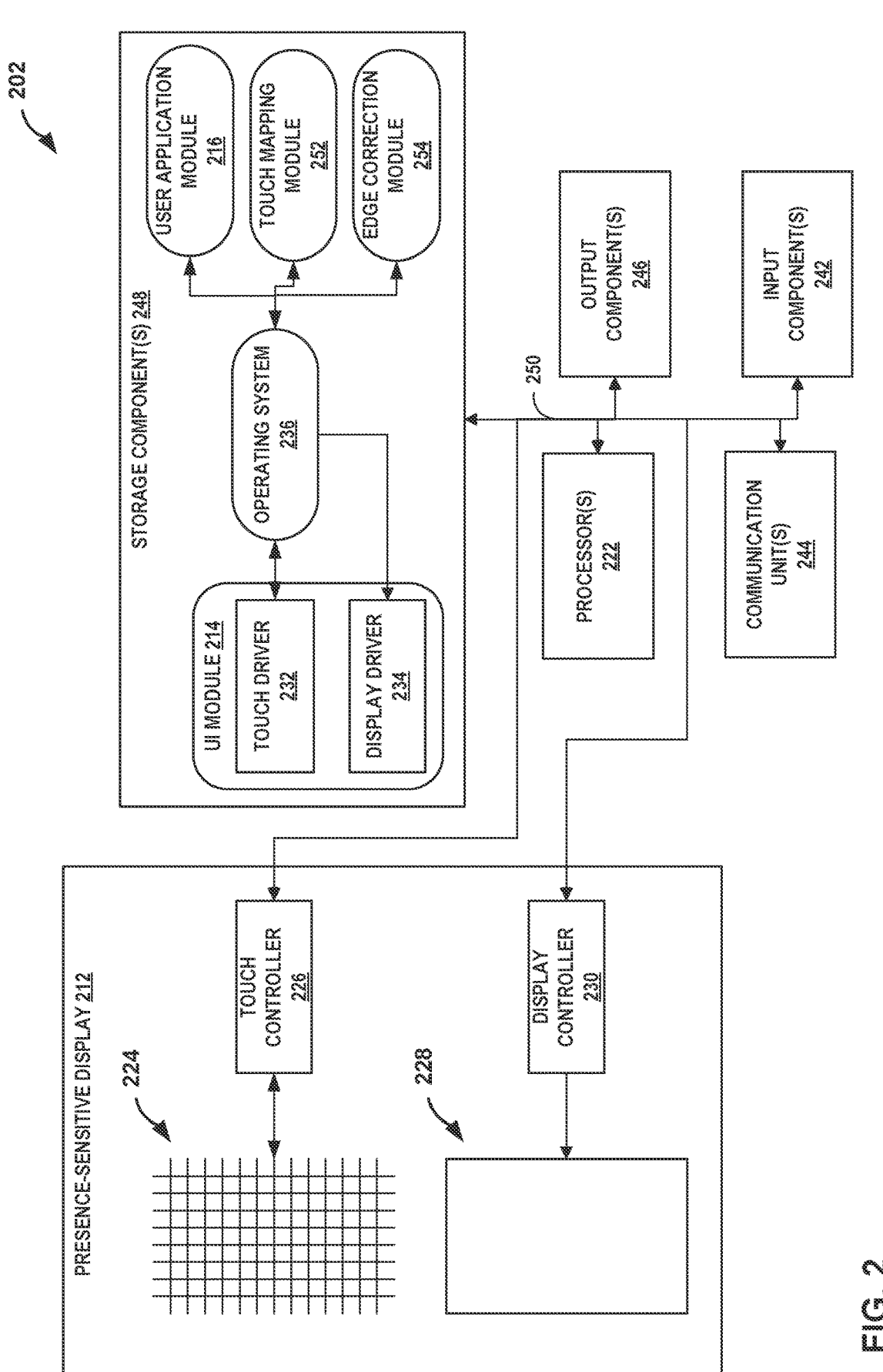
FIG. 2 is a block diagram illustrating further details of a computing device that performs touch coordinate edge correction, in accordance with one or more techniques of this disclosure.

FIG. 2 is a block diagram illustrating further details of a computing device 202 that performs touch coordinate edge correction, in accordance with one or more techniques of this disclosure. Computing device 202 of FIG. 2 is described below as an example of computing device 102 illustrated in FIG. 1. FIG. 2 illustrates only one particular example of computing device 202, and many other examples of computing device 202 may be used in other instances and may include a subset of the components included in example computing device 202 or may include additional components not shown in FIG. 2.

As shown in FIG. 2, computing device 202 may include presence-sensitive display 212, processor(s) 222, one or more input components 242, one or more communication units 244, one or more output components 246, and one or more storage components 248. Presence-sensitive display 212 may include electrodes 224, touch controller 226, display panel 228, and display controller 230. As also shown in FIG. 2, one or more storage components 248 may include UI module 214, user application module 216, operating system 236, touch mapping module 252, and edge correction module 254.

Communication channels 250 may interconnect each of the components 212, 222, 242, 244, 246, and 248 for inter-component communications (physically, communicatively, and/or operatively). In some examples, communication channels 250 may include a system bus, a network connection, an inter-process communication data structure, or any other method for communicating data.

One or more input components 242 of computing device 202 may receive input. Examples of input are tactile, audio, and video input. Input components 242 of computing device 202, in one example, includes a presence-sensitive display, touch-sensitive screen, mouse, keyboard, voice responsive system, video camera, microphone or any other type of device for detecting input from a human or machine.

One or more input components 242 include one or more sensors. Numerous examples of sensors exist and include any input component configured to obtain environmental information about the circumstances surrounding computing device 202 and/or physiological information that defines the activity state and/or physical well-being of a user of computing device 202. In some examples, a sensor may be an input component that obtains physical position, movement, and/or location information of computing device 202. For instance, sensors may include one or more location sensors (GPS components, Wi-Fi components, cellular components), one or more temperature sensors, one or more motion sensors (e.g., multi-axial accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 202 may generate output. Examples of output are tactile, audio, and video output. Output components 246 of computing device 202, in one example, includes a presence-sensitive display, sound card, video graphics adapter card, speaker, liquid crystal display (LCD), or any other type of device for generating output to a human or machine.

One or more communication units 244 of computing device 202 may communicate with external devices via one or more wired and/or wireless networks by transmitting and/or receiving network signals on the one or more networks. Examples of communication units 244 include a network interface card (e.g. such as an Ethernet card), an optical transceiver, a radio frequency transceiver, a GPS receiver, or any other type of device that can send and/or receive information. Other examples of communication units 244 may include short wave radios, cellular data radios, wireless network radios, as well as universal serial bus (USB) controllers.

Presence-sensitive display 212 of computing device 202 includes electrodes 224, touch controller 226, display panel 228, and display controller 230. Electrodes 224 may form a matrix of row and column electrodes on either side of a dielectric material. Electrodes 224 may be constructed from a transparent conductive material, such as Indium Tin Oxide (ITO). As such, electrodes 224 may be placed above a display component (e.g., display panel 228) and be invisible to a user. The dielectric material may be a glass substrate.

Touch controller 226 may perform one or more operations to sense user input via electrodes 224. For instance, touch controller 226 may output a voltage signal across the electrodes and sense a resultant change in capacitance (e.g., as induced by the presence of a finger or other object on or near presence-sensitive display 212). When an electrode of electrodes 224 is driven with a voltage signal, the electrode's inherent capacitance to other objects can be measured (such as a human finger, another electrode, or ground). Changes to the surrounding environment affect changes in the inherent capacitance of the electrode. Touch controller 226 may output an indication of the sensed user input to one or more other components of computing device 202, such as UI module 214.

Display panel 228 may be a display device capable of rendering graphical user interfaces. Examples of display panel 228 include, but are not limited to, liquid crystal displays (LCD), dot matrix displays, light emitting diode (LED) displays, microLED displays organic light-emitting diode (OLED) displays, e-ink, or similar monochrome or color displays capable of outputting visible information to a user of computing device 202.

Display controller 230 may perform one or more operations to manage the operation of display panel 228. For instance, display controller 30 may receive instructions from UI module 214 that cause display controller 230 to control display panel 228 to render a particular graphical user interface.

Processor(s) 222 may implement functionality and/or execute instructions within computing device 202. For example, processor(s) 222 may receive and execute instructions that provide the functionality of UI module 214, user application module 216, operating system 236, touch mapping module 252, and edge correction module 254. These instructions executed by processor(s) 222 may cause computing device 202 to store and/or modify information within one or more storage components 248 of processor(s) 222 during program execution. Processor(s) 222 may execute instructions of UI module 214, user application module 216, operating system 236, touch mapping module 252, and edge correction module 254 to perform one or more operations. That is, UI module 214, user application module 216, operating system 236, and edge correction module 254 may be operable by processor(s) 222 to perform various functions described herein.

One or more storage components 248 within computing device 202 may store information for processing during operation of computing device 202 (e.g., computing device 202 may store data accessed by UI module 214, user application module 216, operating system 236, touch mapping module 252, and edge correction module 254 during execution at computing device 202). In some examples, storage component 248 is a temporary memory, meaning that a primary purpose of storage component 248 is not long-term storage. Storage components 248 on computing device 202 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 may be configured to store larger amounts of information than volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with UI module 214, user application module 216, operating system 236, touch mapping module 252, and edge correction module 254.

As discussed above, UI module 214 may act as an intermediary between various components of computing device 202 to make determinations based on user input detected by an user interface component and generate output at the user interface component in response to the user input. As shown in FIG. 2, UI module 214 may include touch driver 232 and display driver 234. Touch driver 232 may interact with touch controller 226 and operating system 36 to process user input sensed via presence-sensitive display 212. Display driver 234 may interact with display controller 230 and operating system 236 to process output for display at display panel 228, which may be altered based on user input received via electrodes 224.

Operating system 236, or a component thereof, may manage interactions between applications and a user of computing device 202. As shown in the example of FIG. 2, operating system 236 may manage operations between user application module 216 and a user of computing device 202. In some examples, UI module 214 may be considered to be a component of operating system 236.

Touch mapping module 252 may map touch input data generated by a touch sensor (e.g., one or more of electrodes 224) of presence-sensitive display 212 to a touch location at the presence-sensitive display 212, as described in further detail below. In some examples, touch mapping module 252 may be considered to be a component of operating system 236. Edge correction module 254 may determine that the touch location is within an edge region of presence-sensitive display 212 and may, in response to determining that the touch location is within the edge region of presence-sensitive display 212, determine, based at least in part on the touch location, a corrected touch location at the presence-sensitive display 212 that is closer to a nearest edge of the presence-sensitive display 212 than the touch location, as described in further detail below. In some examples, edge correction module 254 may be considered to be a component of operating system 236.

Presence-sensitive display 212 may detect the user input using one or both of a self-capacitance scan and mutual-capacitance scan. In particular, electrodes 224, touch controller 226, and touch driver 232 may collectively operate to generate mutual-capacitance data based on a mutual-capacitance scan and/or to generate self-capacitance data based on a self-capacitance scan. Further details of a self-capacitance scan are discussed below with reference to FIG. 3. Further details of a mutual-capacitance scan are discussed below with reference to FIG. 4.

Figure 3:
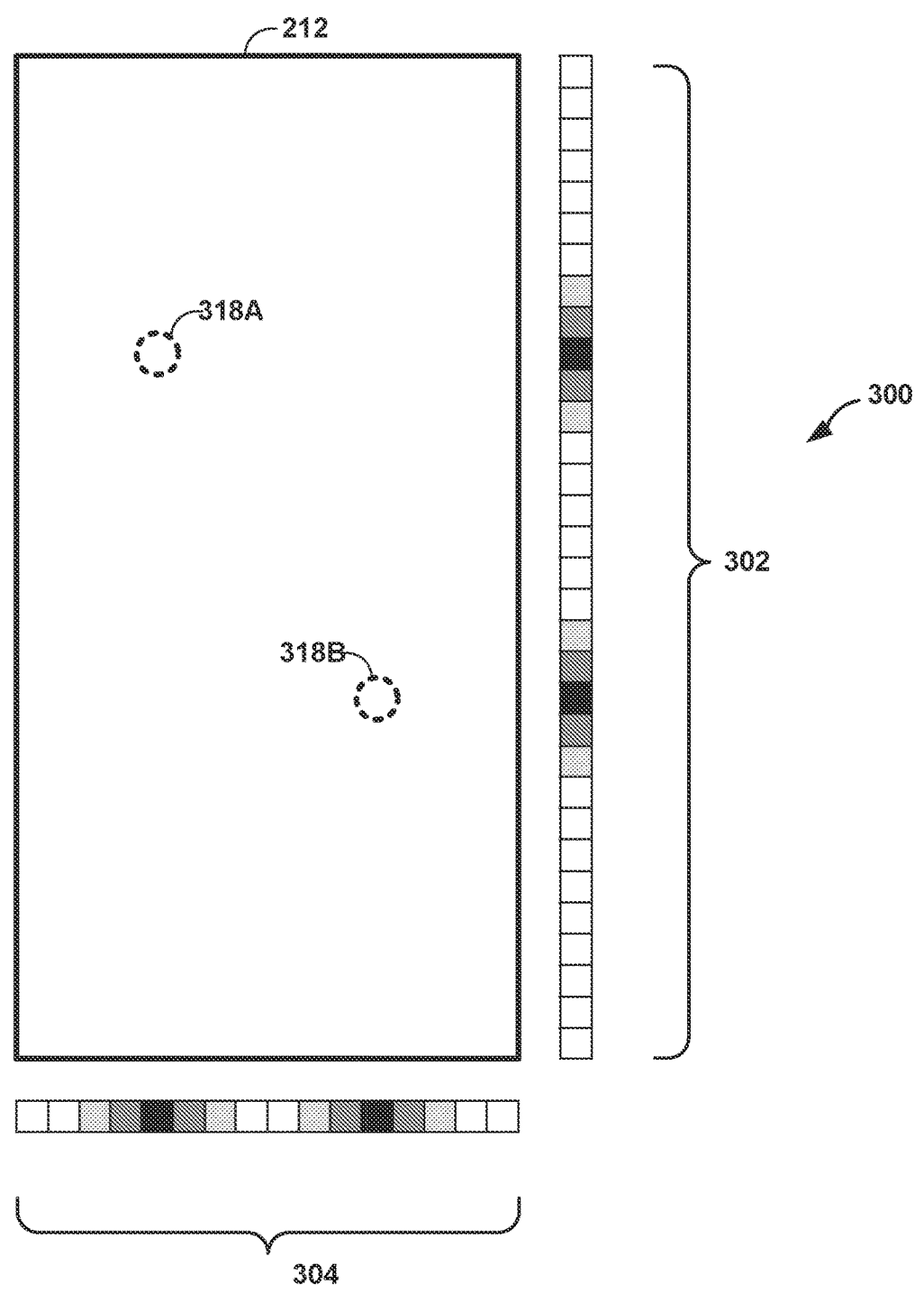
FIG. 3 is a conceptual diagram illustrating example self-capacitance data generated by a presence-sensitive display of a computing device, in accordance with one or more techniques of this disclosure.

FIG. 3 is a conceptual diagram illustrating example self-capacitance data generated by a presence-sensitive display of a computing device, in accordance with one or more techniques of this disclosure. Self-capacitance data 300 of FIG. 3 is discussed with reference to computing device 202 of FIG. 2. However, other computing devices may generate self-capacitance data 300. To perform a self-capacitance scan (also referred to as a surface capacitance scan), touch controller 226 may drive an electrode of electrodes 224 with a signal and measure the capacitance across the entire electrode (e.g., with respect to ground). When another conductive object approaches the electrode, a capacitor is formed between them—reducing the capacitance between the electrode and ground. Touch controller 226 measures this capacitance by driving all electrodes of electrodes 224 in each direction (e.g., all of the rows and then all of the columns) and measuring their capacitance. Where electrodes 224 includes r row electrodes and c column electrodes, the self-capacitance scan produces r+c measurements, which are collectively referred to as self-capacitance data 300.

Self-capacitance data 300 of FIG. 3 may represent self-capacitance data measured by presence-sensitive display 212, such as when the user is performing a pinch gesture. As shown in FIG. 3, self-capacitance data 300 includes row capacitance values 302 and column capacitance values 304. For row capacitance values 302 and column capacitance values 304, darker locations indicate higher values. As can be seen in row capacitance values 302 and column capacitance values 304, by placing their fingers at positions 318A and 318B, the user may induce higher capacitance values.

Figure 4:
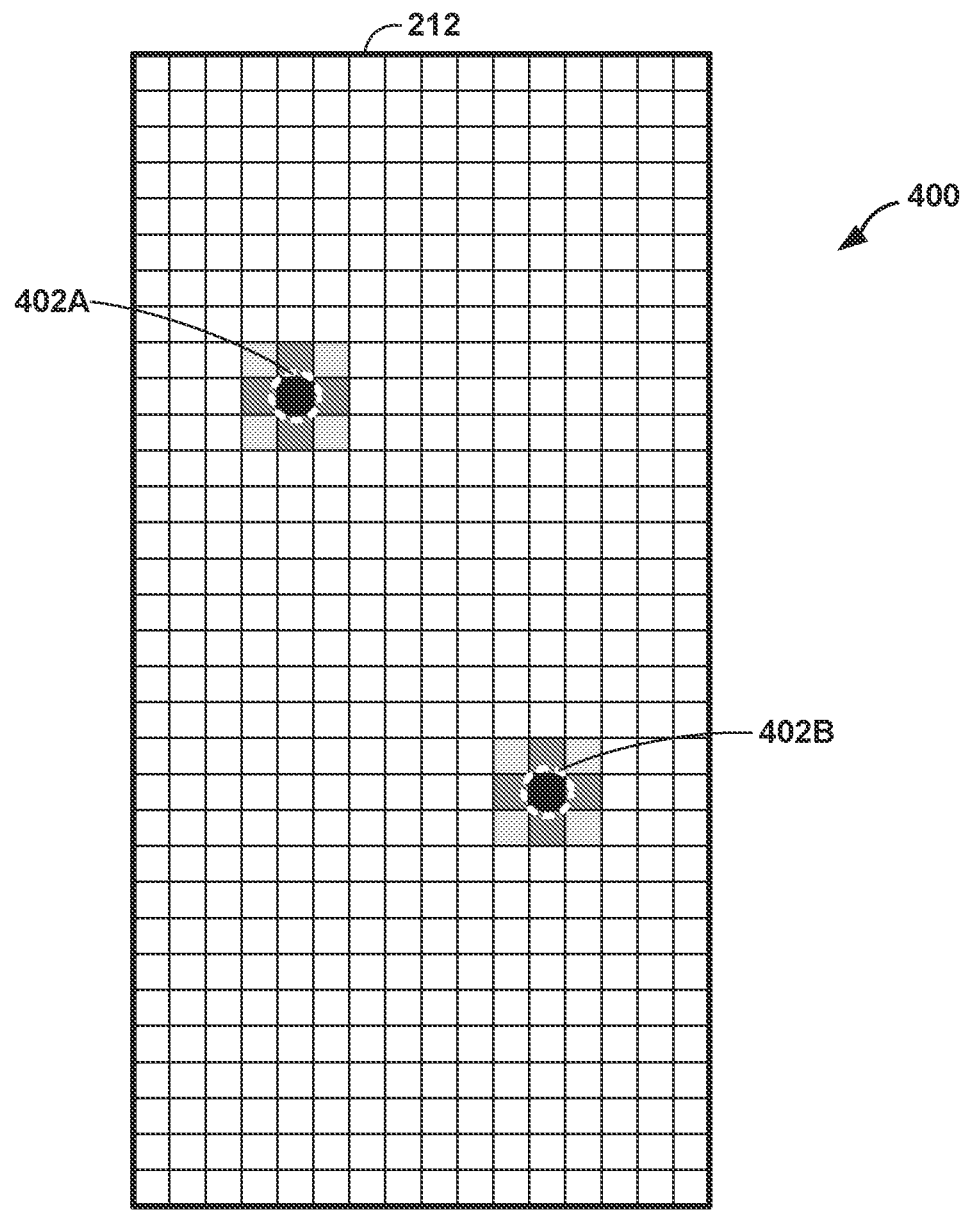
FIG. 4 is a conceptual diagram illustrating example mutual-capacitance data generated by a presence-sensitive display of a computing device, in accordance with one or more techniques of this disclosure.

FIG. 4 is a conceptual diagram illustrating example mutual-capacitance data generated by a presence-sensitive display of a computing device, in accordance with one or more techniques of this disclosure. Mutual-capacitance data 400 of FIG. 4 is discussed with reference to computing device 202 of FIG. 2. However, other computing devices may generate mutual-capacitance data 400.

To perform a mutual-capacitance scan, touch controller 226 may take advantage of the inherent capacitive coupling that exists between the row and column electrodes of electrodes 224 at the locations that they overlap (e.g., touch sensor cells). For instance, touch controller 226 may drive a single electrode of electrodes 224 (e.g., a row) and measure the capacitance on the intersecting electrodes of electrodes 224 (e.g., the columns). Touch controller 226 may repeat this process until all touch sensor cells have been sensed. Where electrodes 224 includes r row electrodes and c column electrodes, the mutual-capacitance scan produces r×c measurements, which are collectively referred to as mutual-capacitance data 400. For mutual-capacitance data 400, darker cells indicate higher values. Mutual-capacitance sensing therefore involves the sensing of each cell individually to generate a full "image" of the panel, which may allow touch controller 226 to unambiguously separate each contact.

Figure 5:
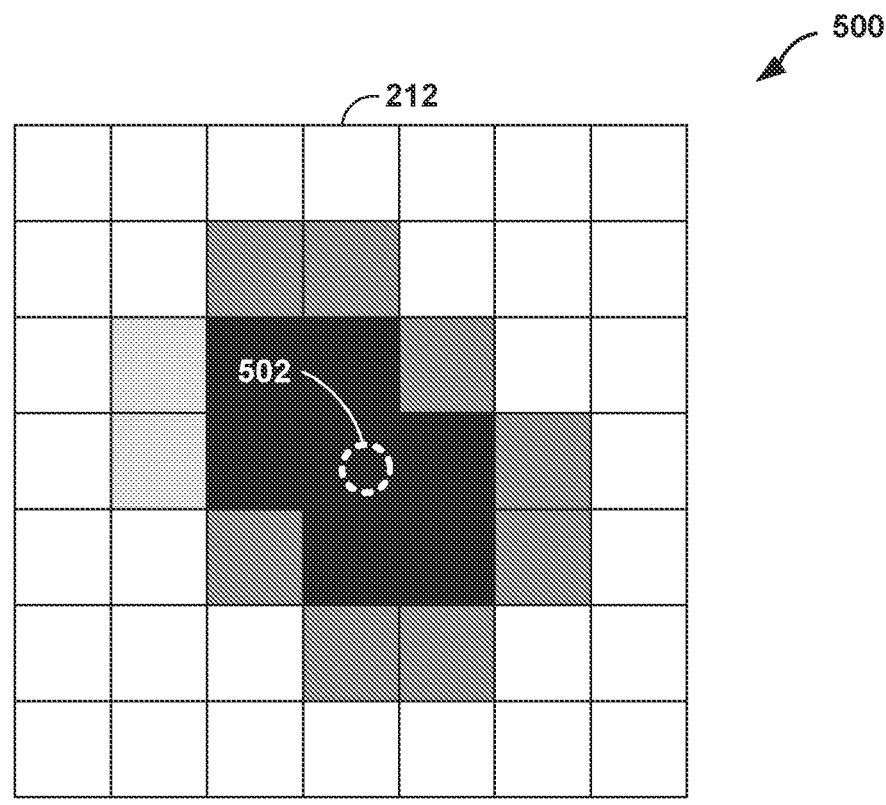
FIG. 5 is a cropped set of mutual-capacitance data, in accordance with one or more techniques of this disclosure.

FIG. 5 is a cropped set of mutual-capacitance data, in accordance with one or more techniques of this disclosure. Mutual-capacitance data 500 of FIG. 5 may represent an area of mutual-capacitance data surrounding a contact (e.g., a finger contact) and is discussed with reference to computing device 202 of FIG. 2. As shown in FIG. 5, by bringing an input object, such as a finger, in proximity with a presence-sensitive display, the capacitance of several cells may be altered. As discussed herein, based on the altering of these capacitances, touch controller 226 may identify touch contacts using mutual-capacitance data.

For each identified touch contact, touch controller 226 may identify the covered cells of the contact and determine, based on the covered cells, a location 502 of display panel 228 that corresponds to the covered cells, such as a set of coordinates that are in the resolution of display panel 228. In the example of FIG. 5, touch controller 226 may identify the covered cells as a contiguous set of non-white cells (e.g., a set of contiguous cells all having a capacitance value greater than a threshold value). To determine the set of coordinates that are in the resolution of display panel 228, touch controller 226 may perform a weighted average of the coordinates of each of the covered cells, where each covered cell is weighted based on the capacitance values of the covered cell. Touch controller 226 may therefore determine, based on the weighted average of the coordinates of the covered cells, the location 502 of display panel 228 that correspond to the covered cells.

Figure 6:
FIG. 6 is a cropped set of mutual-capacitance data for user input at an edge of a display, in accordance with one or more techniques of this disclosure.
Figure 6:
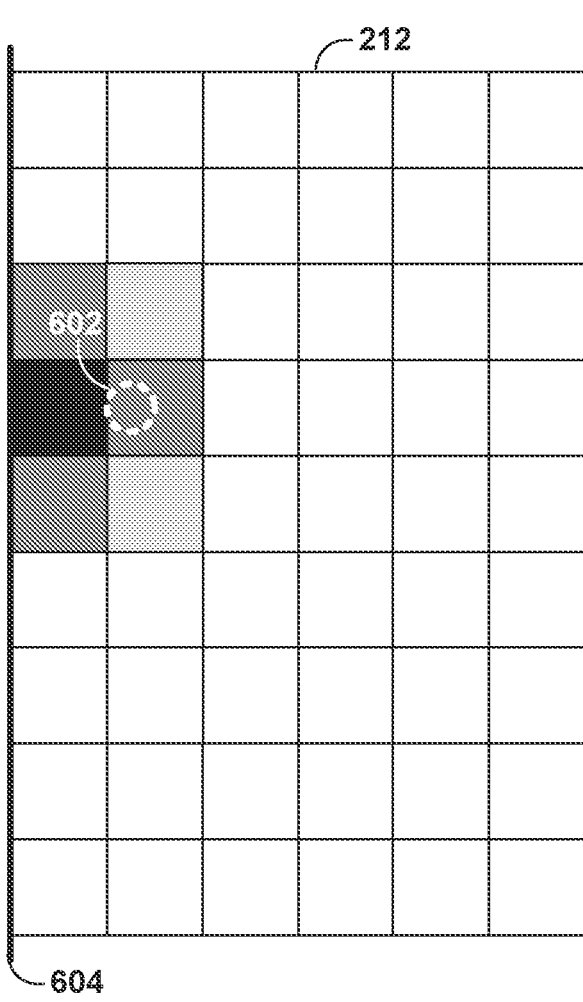

FIG. 6 is a cropped set of mutual-capacitance data for user input at an edge of a display, in accordance with one or more techniques of this disclosure. Mutual-capacitance data 600 of FIG. 6 may represent an area of mutual-capacitance data surrounding a contact (e.g., a finger contact) and is discussed with reference to computing device 202 of FIG. 2. As shown in FIG. 6, when a user attempts to provide user input at or near an edge 604 of a presence-sensitive display with the user's finger, the touch location 602 of display panel 228 that correspond to the covered cells may nevertheless not correspond to a pixel of display panel 228 at the edge 604 of display panel 228 even when the user may attempt to use just a portion of the user's finger to provide user input. As such, determining touch location 602 based on weighted average of the coordinates of each of the covered cells may prevent the user from providing user input that corresponds to pixels at or near the edge of display panel 228.

Figure 7:
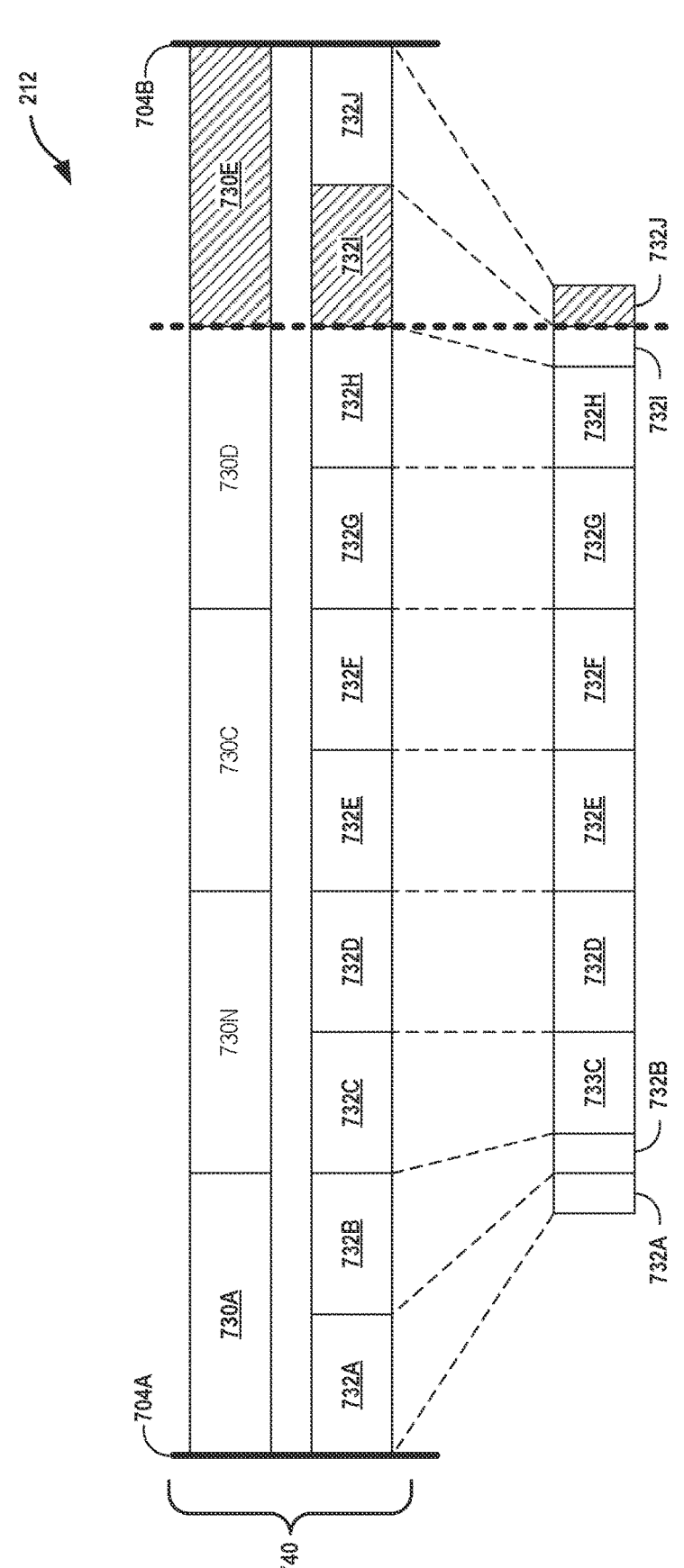
FIG. 7 is a conceptual diagram illustrating example techniques for performing touch coordinate edge correction, in accordance with one or more techniques of this disclosure.

FIG. 7 is a conceptual diagram illustrating example techniques for performing touch coordinate edge correction, in accordance with one or more techniques of this disclosure. As shown in FIG. 7, a row 740 of pixels 732A-732J ("pixels 732") of presence-sensitive display 212 that spans from edge 704A to edge 704B of presence-sensitive display 212 may be covered by touch sensor cells 730A-730E ("touch sensor cells 730"). That is, because the touch sensor of presence-sensitive display 212 is of a lower resolution than the display resolution of presence-sensitive display 212, the width of each touch sensor cell of the touch sensor may conceptually span (e.g., "cover") the width of two or more pixels of presence-sensitive display 212.

In the example of FIG. 7, each touch sensor cell of touch sensor cells 730 covers two pixels of pixels 732. Touch sensor cell 730A covers pixels 732A and 732B, touch sensor cell 730B covers pixels 732C and 732D, touch sensor cell 730C covers pixels 732E and 732F, touch sensor cell 730D covers pixels 732G and 732I, and touch sensor cell 730E covers pixels 732I and 732J.

If a user provides touch input wholly within touch sensor cell 730E, such as when touch sensor cell 730E is the only sensor cell of touch sensor cells 730 that senses the touch input, computing device 202 may map the touch input to either pixel 732I or pixel 732J, depending on factors such as the alignment of touch sensor cell 730E to pixels 732I and 732J. In certain cases, the touch input at touch sensor cell 730E may always be mapped to pixel 732I and may never be mapped to pixel 732J, which may make it impossible to the user to provide touch input that maps to pixel 732J at edge 704B of presence-sensitive display 212.

In order to enable the user to more easily provide user input at the edges 704A and 704B of computing device 202, computing device 202 may adjust the mapping of touch inputs detected near an edge of presence-sensitive display 212, such as near edge 704A or edge 704B, to bias the touch inputs towards pixels at the edges 704A and 704B of presence-sensitive display 212. Biasing the touch inputs towards pixels at the edges 704A and 704B of presence-sensitive display 212 may make it easier for the user to provide user input at the edges 704A and 704B of computing device 202.

Biasing the touch inputs towards pixels 732 at the edges 704A and 704B of presence-sensitive display 212 effectively decreases the widths of the pixels 732 near the edges 704A and 704B of presence-sensitive display 212 by a predefined amount for the purposes of mapping a touch input to a pixel. That is, although the physical width of pixels 732 cannot change, computing device 202 may, when mapping a touch input to a pixel, determine values for the width of pixels 732 near the edges 704A and 704B of presence-sensitive display 212 that are smaller than the actual physical width of pixels 732, thereby biasing touch inputs towards pixels 732 at the edges 704A and 704B of presence-sensitive display 212.

In the example of FIG. 7, computing device 202 effectively decreases the width of pixels 732A-732C at edge of presence-sensitive display 212 and the widths of pixels 732H-732J at edge of presence-sensitive display 212 for the purposes of biasing touch inputs towards pixels 732 at the edges 704A and 704B of presence-sensitive display 212. Computing device 202 may refrain from effectively decreasing the widths of pixels that are not near edges 704A and 704B of presence-sensitive display 212, such as the widths of pixels 732D-732G, when mapping touch inputs to pixels 732 thereby preventing distorting the mapping of touch input to locations of presence-sensitive display 212 where such biasing of touch inputs may not be necessary.

By effectively decreasing the width of pixels 732A-732C near edge 704A of presence-sensitive display 212 and the widths of pixels 732H-732J near edge 704B of presence-sensitive display 212, computing device 202 may, for the purposes of mapping touch inputs to pixels 732 cause touch sensor cell 730E at edge 704B of presence-sensitive display 212 to cover only pixel 732J. Thus, when a user provides touch input wholly within touch sensor cell 730E, such as when touch sensor cell 730E is the only sensor cell of touch sensor cells 730 that senses the touch input, computing device 202 may map the touch input to pixel 732J at edge 704B of presence-sensitive display 212.

Figure 8:
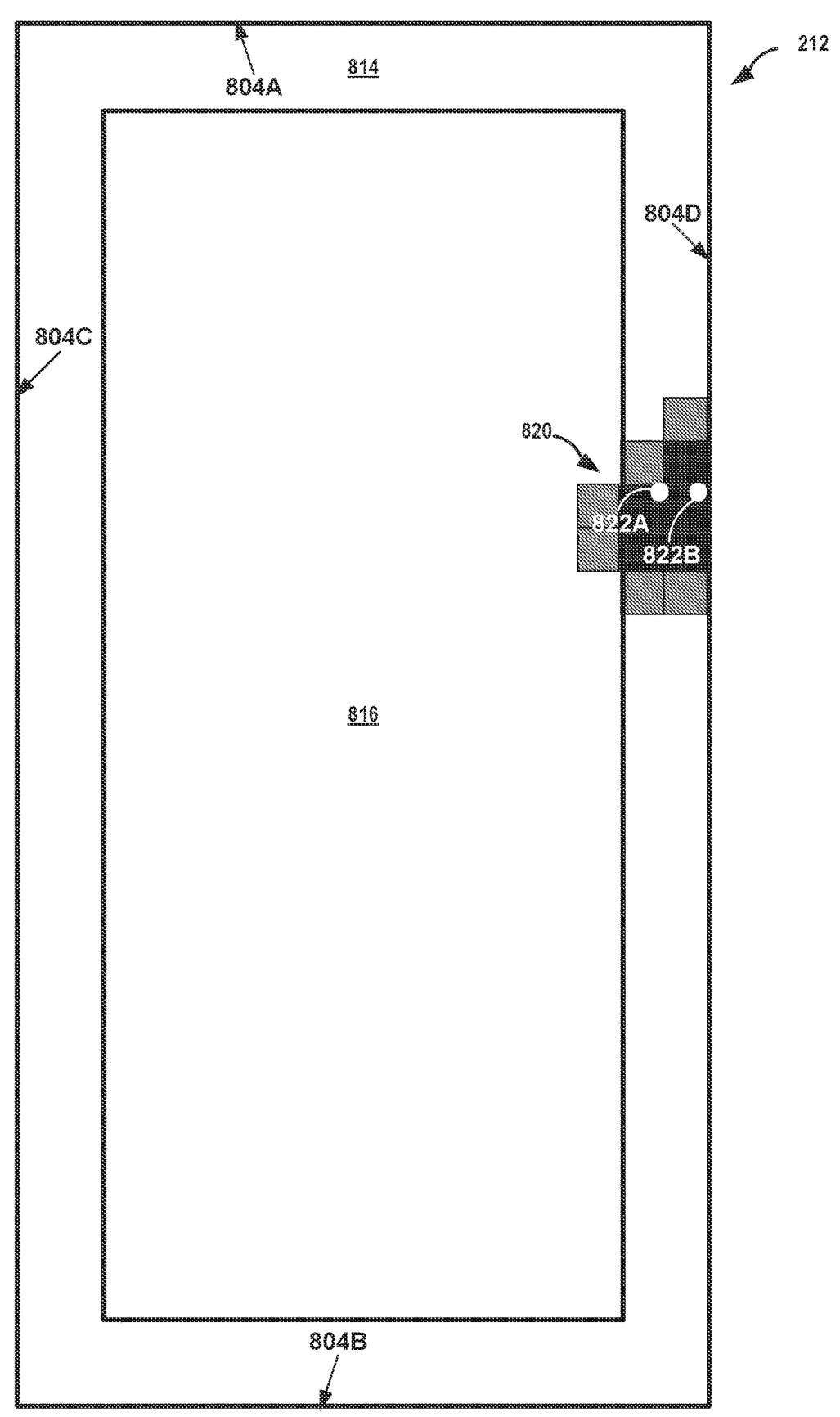
FIG. 8 is a conceptual diagram illustrating an example technique for performing touch coordinate edge correction, in accordance with aspects of the present disclosure.

FIG. 8 is a conceptual diagram illustrating an example technique for performing touch coordinate edge correction, in accordance with aspects of the present disclosure. As shown in FIG. 8, presence-sensitive display 212 may include edge region 814. Edge region 814 is an outer boundary of pixels of presence-sensitive display 212 surrounding non-edge region 816 of presence-sensitive display 212. When the user provides touch input at or near an edge of presence-sensitive display 212, touch controller 226 and/or processor(s) 222 may determine whether the corresponding touch location mapped from the touch input is within edge region 814. If touch controller 226 and/or processor(s) 222 determines that the corresponding touch location is within edge region 814, touch controller 226 and/or processor(s) 222 may apply an offset to the touch location to determine a corrected touch location that is closer than the touch location to the nearest edge of presence-sensitive display 212.

When the user provides touch input, such as by performing a gesture input, at or near an edge of presence-sensitive display 212, touch sensor cells 820 (i.e., the darkened cells in FIG. 8) may sense the touch input and may generate touch input data that indicates the touch input sensed by touch sensor cells 820. For example, each cell of touch sensor cells may generate capacitance data, such as a capacitance value of the cell.

Touch controller 226 and/or processor(s) 222 may map the touch input to a touch location based at least in part on the touch sensor data generated by touch sensor cells 820. For example, touch controller 226 and/or processor(s) 222 may determine a weighted average of the locations of touch sensor cells 820 based on the capacitance value generated by each cell to map the touch input to a touch location. In other examples, touch controller 226 and/or processor(s) 222 may perform a centroid calculation based on the locations of each of touch sensor cells 820 and the capacitance values generated by each of touch sensor cells 820 to map the touch input to a touch location.

In the example of FIG. 8, the touch input may correspond to touch location 822A. Touch controller 826 may determine that touch location 822A is within edge region 814 of presence-sensitive display 212, and touch controller 226 and/or processor(s) 222 may, based on touch location 822A being within edge region 814, apply an offset to location 822A to determine a corrected location 822B that is closer to a nearest edge 804 of the presence-sensitive display 212 than the touch location 822A.

Touch controller 226 and/or processor(s) 222 may determine, from touch location 822A, corrected touch location 822B, based at least in part on a width of edge region 814 and an edge correction offset. The width of edge region 814 may be the width of at least one of the touch sensor cells (e.g., one of touch sensor cells 802) The width of a touch sensor cell may be the width of a region of pixels that corresponds to a touch sensor cell. For example, if presence-sensitive display 212 has a width of ten pixels and if the touch sensor of presence-sensitive display 212 includes a matrix of touch sensor cells with five touch sensor cells in each row of the matrix, the width of a touch sensor cell may be 10/5=2 pixels.

The width of edge region 814 may be expressed in pixels. For example, if the width of edge region 814 is the width of two touch sensor cells, where each of the touch sensor cells has a width of two pixels, the width of edge region 814 may be four pixels. In some examples, the width of edge region 814 may be expressed as a physical measurement, such as in millimeters. Thus, if the width of edge region 814 is the width of two touch sensor cells, where each of the touch sensor cells has a width of two pixels, the width of edge region 814 may be the width of four pixels in millimeters.

The edge correction offset may correspond to the width of edge region 814. In some examples, the edge correction offset may be at least half the width of edge region 814, but may be less than the entire width of edge region 814. If the width of edge region 814 is 20 millimeters, the edge correction offset may be at least 10 millimeters and may be less than 20 millimeters.

Touch controller 226 and/or processor(s) 222 may determine, for a touch location within edge region 814, a corrected touch location based on the edge of presence-sensitive display 212 that is nearest to the touch location. A touch location in presence-sensitive display 212 may be expressed in (x, y) coordinates as a value in the x-axis and a value in the y-axis. In the example where presence-sensitive display 212 is a rectangular display having a top-left coordinate of (0, 0), touch controller 226 and/or processor(s) 222 may determine that a nearest edge of a touch location within edge region 814 is the top edge 804A of presence-sensitive display 212 if the value of the location in the y-axis is smaller than the width of edge region 814, and may determine that a nearest edge of a touch location within edge region 814 is the left edge 804C of presence-sensitive display 212 if the value of the location in the x-axis is smaller than the width of edge region 814. Similarly, touch controller 226 and/or processor(s) 222 may determine that a nearest edge of a touch location within edge region 814 is the bottom edge 804B of presence-sensitive display 212 if the value of the touch location in the y-axis is greater than the total number of pixels in the y-axis of presence-sensitive display 212 minus the width of edge region 814, and may determine that a nearest edge of a touch location within edge region 814 is the right edge 804D of presence-sensitive display 212 if the value of the touch location in the x-axis is greater than the total number of pixels in the x-axis of presence-sensitive display 212 minus the width of edge region 814.

Touch controller 226 and/or processor(s) 222 may apply a correction to a touch location within edge region 814 to determine a corrected touch location by at least applying an edge correction offset to the coordinate value of the touch location in the axis perpendicular to the nearest edge of presence-sensitive display 212 to determine a corrected coordinate value of the touch location in the axis perpendicular to the nearest edge of presence-sensitive display 212.

When a nearest edge of a touch location within edge region 814 is the top edge 804A or left edge 804C of presence-sensitive display 212, touch controller 226 and/or processor(s) 222 may apply a correction to the touch location to determine a corrected touch location by transforming the coordinate value c of the touch location along the axis perpendicular to the nearest edge of presence-sensitive display 112 to a corrected coordinate value c' according to Equation 1:

$$c' = \frac{w(c - o)}{w - o} \tag{1}$$

where w is the width of edge region 814 and o is an edge correction offset.

Specifically, when the nearest edge of a touch location is top edge 804A, the axis perpendicular to top edge 804A may be the y-axis, such that given the touch location being at (x, y), touch controller 226 and/or processor(s) 222 may apply Equation 1 to transform the touch location to a corrected location at (x, y'), where $$y' = \frac{w(y - o)}{w - o}.$$

When the nearest edge of a touch location is left edge 804C, the axis perpendicular to left edge 804C may be the x-axis, such that given the touch location being at (x, y), touch controller 226 and/or processor(s) 222 may apply Equation 1 to transform the touch location to a corrected location at (x', y), where $$x' = \frac{w(x - o)}{w - o}.$$

When a nearest edge of a touch location within edge region 814 is bottom edge 804B or right edge 804D of presence-sensitive display 212, touch controller 226 and/or processor(s) 222 may apply a correction to the location to determine a corrected location by transforming the coordinate value c of the location along the axis perpendicular to the nearest edge of presence-sensitive display to a corrected coordinate value c' according to Equation 2:

$$c' = \frac{wc + wo - os}{w - o} \qquad (2)$$

where w is the width of edge region 814, o is an edge correction offset, and s is the total number of pixels of presence-sensitive display 212 in a single row and/or column that are along the axis perpendicular to the nearest edge.

When the nearest edge of a touch location is right edge 804D, the axis perpendicular to right edge 804D may be the x-axis, such that given the touch location being at (x, y), touch controller 226 and/or processor(s) 222 may apply Equation 2 to transform the touch location to a corrected location at (x', y), where $$x' = \frac{wx + wo - os}{w - o}.$$

When the nearest edge of a touch location is bottom edge 804B, the axis perpendicular to bottom edge 804B may be the y-axis, such that given the touch location being at (x, y), touch controller 226 and/or processor(s) 222 may apply Equation 2 to transform the touch location to a corrected location at (x, y'), where $$y' = \frac{wy + wo - os}{w - o}.$$

In the example of FIG. 8, the nearest edge of touch location 822A is right edge 804D. As such, touch controller 226 and/or processor(s) 222 may transform coordinate values (x, y) of touch location 822 to coordinate values (x', y) according to Equation 2 to map touch location 822A to corrected touch location 822B having the coordinate values (x', y), which may be closer to right edge 804D than touch location 822A.

Touch controller 226 and/or processor(s) 222 may clamp the coordinate values of the corrected location to the bounds of presence-sensitive display 212. That is, the coordinate value of the corrected touch location along the x-axis may be no smaller than zero and may be no greater than the total number of pixels along the x-axis of presence-sensitive display 212 minus one. That is, if presence-sensitive display

212 has 1,024 pixels along its x-axis, the coordinate value of the corrected touch location along the x-axis may be between 0 and 1,023. Similarly, the coordinate value of the corrected touch location along the y-axis may be no smaller than zero and may be no greater than the total number of pixels along the y-axis of presence-sensitive display 212 minus one. That is, if presence-sensitive display 212 has 512 pixels along its y-axis, the coordinate value of the corrected touch location along the x-axis may be between 0 and 511.

In the above examples, the touch location is transformed to a corrected touch location using a linear transformation. That is, the distance between a touch location and a corrected touch location transformed from the touch location may not change depending on how far the touch location is from the nearest edge of presence-sensitive display 212. In some examples, the touch location may be transformed to a corrected touch location using a non-linear transformation. When a touch location is transformed to a corrected touch location using a non-linear transformation, the distance between the touch location and the corrected touch location transformed from the touch location may change depending on how far the touch location is from the nearest edge of presence-sensitive display 212.

In some examples, touch controller 226 and/or processor(s) 222 may transform a touch location to a corrected touch location using a non-linear transformation when presence-sensitive display 212 is a curved display, such as a waterfall display, where presence-sensitive display 212 is non-flat and curved near two opposing edges (e.g., edges 804C and 804D). Because the user's finger may naturally roll down the curves near the opposing edges of such a curved display when attempting to provide user input at or near such a curved edge, it may be relatively easier for the user to provide user input at or near such a curved edge. As such, touch controller 226 and/or processor(s) 222 may use a non-linear transformation to map a touch location to a corrected touch location, such that the distance between the touch location and the corrected touch location transformed from the touch location may sharply fall off (decrease) when the touch location is very close to the edge of the display.

In some examples, touch controller 226 and/or processor(s) 222 may adjust the width of edge region 814 and/or the edge correction offset based on the context of computing device 202 to adjust the distance between a touch location within edge region 814 and a corresponding corrected touch location based on the context of computing device 202. That is, touch controller 226 and/or processor(s) 222 may increase or decrease the distance between a touch location with edge region 814 and a corresponding corrected region based on the application currently executing at computing device 202, the user interface elements displayed at presence-sensitive display 212, and the like. For example, when presence-sensitive display 212 displays a virtual keyboard, touch controller 226 and/or processor(s) 222 may adjust the width of a portion of the edge region 814 that overlaps the virtual keyboard and/or the edge correction offset to increase the distance between a touch location within the portion edge region 814 that overlaps the virtual keyboard and a corresponding corrected touch location.

In some examples, touch controller 226 and/or processor(s) 222 may adjust the width of edge region 814 and/or the edge correction offset based on the type of the gesture input performed by the user to provide touch input at presence-sensitive display 212 to adjust the distance between a touch location within edge region 814 and a corresponding corrected touch location based on the gesture input. For example, the touch controller 226 and/or processor(s) 222 may determine different widths of edge region 814 and/or different edge correction offsets based on whether the input gesture is a tap, a swipe gesture to an edge of presence-sensitive display 212, etc. For example, the touch controller 226 and/or processor(s) 222 may, for a swipe gesture, map the touch location to a corresponding corrected touch location that is closer to the nearest edge of presence-sensitive display 212 (e.g., at a greater distance from the touch location) compared with a tap gesture.

In some examples, touch controller 226 and/or processor(s) 222 may adjust the width of edge region 814 and/or the edge correction offset based on how the user grips computing device 202. For example, touch controller 226 and/or processor(s) 222 may adjust the width of a portion of edge region 814 that the user is contacting to grip computing device 202, or may adjust the width of a portion of edge region 814 on the opposing side of the portion of edge region 814 that the user is contacting to grip computing device 202.

In some examples, touch controller 226 and/or processor(s) 222 the width of edge region 814 and/or the edge correction offset may be different for different edges or different portions of edges of presence-sensitive display 212. For example, if a portion of an edge of presence-sensitive display 212 borders a notch, touch controller 226 and/or processor(s) 222 may determine a width of the edge region 814 and/or the edge correction offset for touch input located with the portion of edge region 814 of a portion of the edge of presence-sensitive display 212 that borders a notch that is different than the rest of edge region 814 of presence-sensitive display 212.

In some examples, instead of mapping a touch input to a touch location (e.g., touch location 822A) and then determining a corrected touch location (e.g., corrected touch location 822B) based on the touch location, touch controller 226 and/or processor(s) 222 may also be able to directly map a touch input to a corrected touch location. That is, when determining a location of presence-sensitive display 212 that corresponds to the touch input, such as by performing a centroid calculation, touch controller 226 and/or processor(s) 222 may bias the centroid calculation to determine a touch location for the touch input that is at or near the closest edge of presence-sensitive display 212.

While the above examples describe the techniques of this disclosure with respect to a flat rectangular presence-sensitive display, the techniques of this disclosure are equally applicable to presence-sensitive displays of any shape with any arbitrary arrangement of edges. For example, the techniques of this disclosure may be equally applicable to circular-shaped displays, displays that border notches, and the like.

FIG. 9 is a flowchart illustrating example operations of an example computing device to perform touch coordinate edge correction, in accordance with one or more aspects of the present disclosure. The operations of the example computing device are described within the context of computing device 202 of FIG. 2.

As shown in FIG. 9, one or more processors of computing device 202, such as processor(s) 222 and/or touch controller 226, may map touch input data generated by a touch sensor of a presence-sensitive display 212 to a touch location at the presence-sensitive display 212, wherein the touch input data is indicative of a touch input detected at the presence-sensitive display 212 (902). One or more processors of computing device 202 may determine that the touch location is within an edge region of the presence-sensitive display 212 (904). One or more processors of computing device 202 may, in response to determining that the touch location is within the edge region of the presence-sensitive display 212, determine, based at least in part on the touch location, a corrected touch location at the presence-sensitive display 212 that is closer to a nearest edge of the presence-sensitive display 212 than the touch location (906). One or more processors of computing device 202 may determine that the touch input corresponds to user input at the corrected touch location of the presence-sensitive display 212 (908).

In some examples, to determine the corrected touch location, the one or more processors of computing device 202 may transform, based at least in part on a width of the edge region of the presence-sensitive display 212 and an edge correction offset, the touch location to the corrected touch location. To transform the touch location to the corrected touch location, the one or more processors of computing device 202 may transform, based at least in part on the width of the edge region of the presence-sensitive display and the edge correction offset, a coordinate value of the touch location along an axis perpendicular to the nearest edge to a corrected coordinate value to determine the corrected touch location In some examples, to transform the coordinate value of the touch location along the axis perpendicular to the nearest edge to the corrected coordinate value, the one or more processors of computing device 202 may determine the corrected coordinate value as $$c' = \frac{w(c - o)}{w - o},$$

wherein c' is the corrected coordinate value, c is the coordinate value of the touch location along the axis perpendicular to the nearest edge, w is a width of the edge region, and o is an edge correction offset. In some examples, to transform the coordinate value of the touch location along the axis perpendicular to the nearest edge to the corrected coordinate value, the one or more processors of computing device 202 may determine the corrected coordinate value as $$c' = \frac{wc + wo - os}{w - o},$$

wherein c' is the corrected coordinate value, c is the coordinate value of the touch location along the axis perpendicular to the nearest edge, w is a width of the edge region, o is an edge correction offset and s is a number of pixels of the presence-sensitive display 212 in a single row of pixels along the axis perpendicular to the nearest edge.

In some examples, the width of the edge region is a width of a region of the presence-sensitive display that corresponds to one or more touch sensor cells of the touch sensor. In some examples, the edge correction offset is at least half of the width of the edge region.

In some examples, one or more processors of computing device 202 may determine the corrected touch location at the presence-sensitive display 212 further based at least in part on a context of computing device 202. In some examples, to determine the corrected touch location further based at least in part on the context of computing device 202, the one or more processors of computing device 202 may determine at least one of the width of the edge region or the edge correction offset based at least in part on the context of the computing device.

In some examples, the touch input comprises gesture input, and one or more processors of computing device 202 may determine the corrected touch location at the presence-sensitive display 212 further based at least in part on a type of the gesture input detected at the presence-sensitive display. In some examples, one or more processors of computing device 202 may determine at least one of the width of the edge region or the edge correction offset based at least in part on the type of the gesture input detected at the presence-sensitive display 212.

In some examples, the presence-sensitive display 212 comprises a capacitive touch panel including a capacitive touch sensor, and the capacitive touch sensor is of a lower resolution than a display resolution of the presence-sensitive display 212.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:

mapping, by one or more processors of a computing device, touch input data generated by a touch sensor of a presence-sensitive display to a touch location at the presence-sensitive display, wherein the touch input data is indicative of a touch input detected at the presence-sensitive display;

generating, by the one or more processors, a weighted average location from the touch input data, wherein the touch sensor has a lower resolution than a display resolution of the presence-sensitive display, and wherein the lower resolution of the touch sensor introduces a bias in the weighted average location away from an edge of the presence-sensitive display; and determining, by the one or more processors, that the weighted average location is within an edge region of the presence-sensitive display;

in response to determining that the weighted average location is within the edge region of the presence-sensitive display, correcting the weighted average location toward a nearest edge of the presence-sensitive display to a corrected touch location; and determining, by the one or more processors, that the touch input corresponds to user input at the corrected touch location of the presence-sensitive display.

2. The method of claim 1, wherein the corrected touch location corresponds to a transformation of the weighted average location based at least in part on a width of the edge region of the presence-sensitive display and an edge correction offset.

3. The method of claim 2, wherein the corrected touch location corresponds to a corrected coordinate value resulting from a transformation of a coordinate value of the weighted average location along an axis perpendicular to the nearest edge based at least in part on the width of the edge region of the presence-sensitive display and the edge correction offset.

4. The method of claim 3, wherein the corrected coordinate value results from a formula of $c^{\wedge \prime}=(w(c-o))/(w-o)$, wherein $c^{\wedge \prime}$ is the corrected coordinate value, $c$ is the coordinate value of the weighted average location along the axis perpendicular to the nearest edge, $w$ is the width of the edge region, and $o$ is the edge correction offset.

5. The method of claim 3, wherein the corrected coordinate value results from a formula of $c^{\wedge\prime}=(wc+wo-os)/(w-o)$, wherein $c^{\wedge\prime}$ is the corrected coordinate value, c is the coordinate value of the weighted average location along the axis perpendicular to the nearest edge, w is the width of the edge region, o is the edge correction offset, and s is a number of pixels of the presence-sensitive display in a single row of pixels along the axis perpendicular to the nearest edge.

6. The method of claim 2, wherein the width of the edge region is a width of a region of the presence-sensitive display that corresponds to one or more touch sensor cells of the touch sensor.

7. The method of claim 1, wherein the corrected touch location at the presence-sensitive display is further based at least in part on a context of the computing device.

8. The method of claim 1, wherein the touch input comprises gesture input, and wherein the corrected touch location at the presence-sensitive display is further based at least in part on a type of the gesture input detected at the presence-sensitive display.

9. The method of claim 2, wherein the edge correction offset is at least half of the width of the edge region.

10. The method of claim 1, wherein the presence-sensitive display comprises a capacitive touch panel including a capacitive touch sensor, and wherein the capacitive touch sensor is of a lower resolution than a display resolution of the presence-sensitive display.

11. A computing device comprising:

a presence-sensitive display; and one or more processors communicably coupled to the presence-sensitive display;

a touch mapping module configured to execute at the one or more processors to:

map touch input data generated by a touch sensor of the presence-sensitive display to a touch location at the presence-sensitive display, wherein the touch input data is indicative of a touch input detected at the presence-sensitive display; and an edge correction module configured to execute at the one or more processors to:

generate, by the one or more processors, a weighted average location from the touch input data, wherein the touch sensor has a lower resolution than a display resolution of the presence-sensitive display, and wherein the lower resolution of the touch sensor introduces a bias in the weighted average location away from an edge of the presence-sensitive display, and determine that the weighted average location is within an edge region of the presence-sensitive display;

in response to determining that the weighted average location is within the edge region of the presence-sensitive display, correct the weighted average location toward a nearest edge of the presence-sensitive display to a corrected touch location; and determine that the touch input corresponds to user input at the corrected touch location of the presence-sensitive display.

12. The computing device of claim 11, wherein the corrected touch location corresponds to a transformation of the weighted average location based at least in part on a width of the edge region of the presence-sensitive display and an edge correction offset.

13. The computing device of claim 12, wherein the corrected touch location corresponds to a corrected coordinate value resulting from a transformation of a coordinate value of the weighted average location along an axis perpendicular to the nearest edge based at least in part on the width of the edge region of the presence-sensitive display and the edge correction offset.

14. The computing device of claim 13, wherein the corrected coordinate value results from a formula of $c^{\wedge\prime}=(w(c-o))/(w-o)$, wherein $c^{\wedge\prime}$ is the corrected coordinate value, c is the coordinate value of the weighted average location along the axis perpendicular to the nearest edge, w is the width of the edge region, and o is the edge correction offset.

15. The computing device of claim 13, wherein the corrected coordinate value results from a formula of $c^{\wedge\prime}=(wc+wo-os)/(w-o)$, wherein $c^{\wedge\prime}$ is the corrected coordinate value, c is the coordinate value of the weighted average location along the axis perpendicular to the nearest edge, w is the width of the edge region, o is the edge correction offset, and s is a number of pixels of the presence-sensitive display along the axis perpendicular to the nearest edge.

16. The computing device of claim 12, wherein the edge correction offset is at least half of the width of the edge region.

17. The computing device of claim 11, wherein the corrected touch location is further based at least in part on a context of the computing device.

18. The computing device of claim 11, wherein the touch input comprises gesture input, and wherein the corrected touch location is further based at least in part on a type of the gesture input detected at the presence-sensitive display.

19. The computing device of claim 12, wherein the width of the edge region is a width of a region of the presence-sensitive display that corresponds to one or more touch sensor cells of the touch sensor.

20. A non-transitory computer-readable storage medium storing instructions that, when executed, cause one or more processors of a computing device to:

map touch input data generated by a touch sensor of a presence-sensitive display to a touch location at the presence-sensitive display, wherein the touch input data is indicative of a touch input detected at the presence-sensitive display;

generate, by the one or more processors, a weighted average location from the touch input data, wherein the touch sensor has a lower resolution than a display resolution of the presence-sensitive display, and wherein the lower resolution of the touch sensor introduces a bias in the weighted average location away from an edge of the presence-sensitive display;

determine that the weighted average location is within an edge region of the presence-sensitive display;

in response to determining that the weighted average location is within the edge region of the presence-sensitive display, correct the weighted average location toward a nearest edge of the presence-sensitive display to a corrected touch location; and determine that the touch input corresponds to user input at the corrected touch location of the presence-sensitive display.

\* \* \* \* \*